US012475770B2

(12) United States Patent  
Houston et al.

(10) Patent No.: US 12,475,770 B2  
(45) Date of Patent: Nov. 18, 2025

(54) METHODS AND SYSTEMS FOR DETECTING A TAILGATING EVENT AT AN ACCESS POINT CONTROLLED BY AN ACCESS CONTROL SYSTEM

(71) Applicant: Controlled Electronic Management Systems Limited, Belfast (GB)

(72) Inventors: Allen Houston, Lisburn (GB); Peter Lawrence, Lisburn (GB); Terence Neill, Lisburn (GB)

(73) Assignee: TYCO FIRE & SECURITY GMBH, Neuhausen am Rhenfall (CH)

( * ) Notice: Subject to any disclaimer, the term of this patent is extended or adjusted under 35 U.S.C. 154(b) by 171 days.

(21) Appl. No.: 17/399,484

(22) Filed: Aug. 11, 2021

(65) Prior Publication Data

US 2023/0050055 A1 Feb. 16, 2023

(51) Int. Cl.
| | |
|---|---|
| *G08B 13/196* | (2006.01) |
| *G06F 18/22* | (2023.01) |
| *G06F 18/25* | (2023.01) |
| *G06V 20/52* | (2022.01) |
| *G06V 40/10* | (2022.01) |
| *G07C 9/28* | (2020.01) |
| *H04N 7/18* | (2006.01) |

(52) U.S. Cl.  
CPC .......... *G08B 13/196* (2013.01); *G06F 18/22* (2023.01); *G06F 18/25* (2023.01); *G06V 20/52* (2022.01); *G06V 40/10* (2022.01); *G07C 9/28* (2020.01); *H04N 7/181* (2013.01)

(58) Field of Classification Search  
None  
See application file for complete search history.

(56) References Cited

U.S. PATENT DOCUMENTS 10,303,866 B1 * 5/2019 Van Os ............... G06V 40/172  
10,373,412 B2 * 8/2019 Trani ..................... G07C 9/37  
(Continued)

FOREIGN PATENT DOCUMENTS

EP 3699873 A1 * 8/2020 .......... G06F 16/583  
WO WO-2019226544 A1 * 11/2019 ............ G06F 16/53

OTHER PUBLICATIONS

International Search Report and Written Opinion in PCT/IB2022/057427, mailed Nov. 14, 2022, 15 pages.

*Primary Examiner* — James M Anderson, II  
(74) *Attorney, Agent, or Firm* — ArentFox Schiff LLP (57) ABSTRACT

Apparatus and methods for controlling access to a restricted area by an access control device includes obtaining a first image using a first sensor mounted at a first location. A second image is obtained using a second sensor mounted at a location different from a location of the first sensor. The second image is processed, using the second sensor, to obtain information regarding the detected objects in the second image. The information regarding the detected objects is sent from the second sensor to the first sensor. The first sensor compares the received information with a number of objects detected using the first image. A tailgating event is identified, in response to determining that the number of objects detected using the first image does not match the information regarding the number of objects detected using the second image. A tailgating notification is outputted, by the first sensor, indicating a tailgating event.

20 Claims, 5 Drawing Sheets

(56) References Cited

U.S. PATENT DOCUMENTS

| | | | | |
|---|---|---|---|---|
| 2007/0268145 A1* | 11/2007 | Bazakos | ........... | G07C 9/28 |
| | | | | 340/521 |
| 2021/0209883 A1* | 7/2021 | Arrufat Ribas | ........ | G06V 20/64 |
| 2021/0214184 A1* | 7/2021 | Wolstenholme | .......... | B66B 1/28 |
| 2022/0012469 A1* | 1/2022 | Kucharski | ............. | G06V 20/20 |
| 2022/0092807 A1* | 3/2022 | Niebling | .................. | G07C 9/15 |

* cited by examiner

METHODS AND SYSTEMS FOR DETECTING A TAILGATING EVENT AT AN ACCESS POINT CONTROLLED BY AN ACCESS CONTROL SYSTEM

TECHNICAL FIELD

The present disclosure generally relates to access control systems implementing visual recognition, and more specifically, to detecting a tailgating event at an access point controlled by an access control system.

BACKGROUND

An access control system is often used at public and private premises, such as households, commercial buildings, businesses, retail establishments, schools, hospitals and government buildings, to list a few examples. Access control system nodes may be installed at access points of the premises (such as, but not limited to, external and interior doors of a building) to control access to restricted areas, such as the building itself or to areas within the building. The access control system authenticates (or authorizes) an individual and then permits the authenticated/authorized individual to access the restricted areas through the access point.

Historically, the main components of the access control system are access input devices (such as but not limited to card readers, keypads, cameras, biometric input devices) and access point controllers (such as, but not limited to, a device that controls a position of the access point (e.g., open/closed) or a state of the access point (e.g., locked/unlocked). The access input device is typically installed at an entry area of the access points and enables receipt of one or more credentials (e.g., access card, security code, biometric information) to obtain access to the restricted areas. If the individual is identified and is authorized to obtain access to the restricted area, then the access input device may signal the access point controller, for example, to unlock a door and/or to not generate an alarm. However, in such a system, there is a possibility of unobserved or uncontrolled tailgating, where another individual following closely behind the authorized individual is able to access the restricted area without being authorized.

In view of the foregoing, there is a need to more efficiently and more securely, and in more user friendly manner, control access to restricted areas.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to an access control system that implements visual recognition to identify and authenticate an individual to control access to a restricted area. In some cases, the access control system may further operate in conjunction with multiple visual sensors to determine how many individuals are attempting to enter the restricted area.

One example implementation relates to a method controlling access to a restricted area by an access control device. One aspect of the method comprises obtaining a first image of a surveillance area adjacent to an access point to the restricted area using a first camera mounted at a first location. The first sensor is configured to detect a number of objects in the first image of the surveillance area. Another aspect of the method comprises obtaining a second image using a second sensor mounted at a location different from a location of the first sensor. The second sensor is communicatively coupled to the first sensor. The second sensor is configured to detect one or more objects in the second image. In another aspect of the method, the second image is processed, using the second sensor, to obtain information regarding the one or more detected objects in the second image of the surveillance area. The information regarding the one or more detected objects is sent from the to the first sensor. Another aspect of the method comprises comparing, by the first sensor, the information regarding the one or more objects detected using the second image with a number of objects detected using the first image; and identifying, by the first sensor, a tailgating event in response to determining that the number of objects detected using the first image does not match the information regarding the number of objects detected using the second image. In another aspect of the method, a tailgating notification is outputted, by the first sensor, indicating a tailgating event, in response to identifying the tailgating event.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

This disclosure relates to systems, devices, and methods for managing and controlling access to a restricted area by specific users, such as authorized and/or unauthorized individuals attempting to access the restricted area, by determining whether a number of authorized individuals in a surveillance area adjacent to an access point to the restricted area as detected by a first sensor device matches with a number of individuals in the surveillance area detected by a second sensor device. In particular, in the present disclosure, the system utilizes at least the first and second sensor devices, such cameras, for obtaining different images of a surveillance area from different angles and a management system for determining the access permission level of the identified individuals and for detecting potential tailgating events when the number of individuals in the different images does not match.

Figure 1:
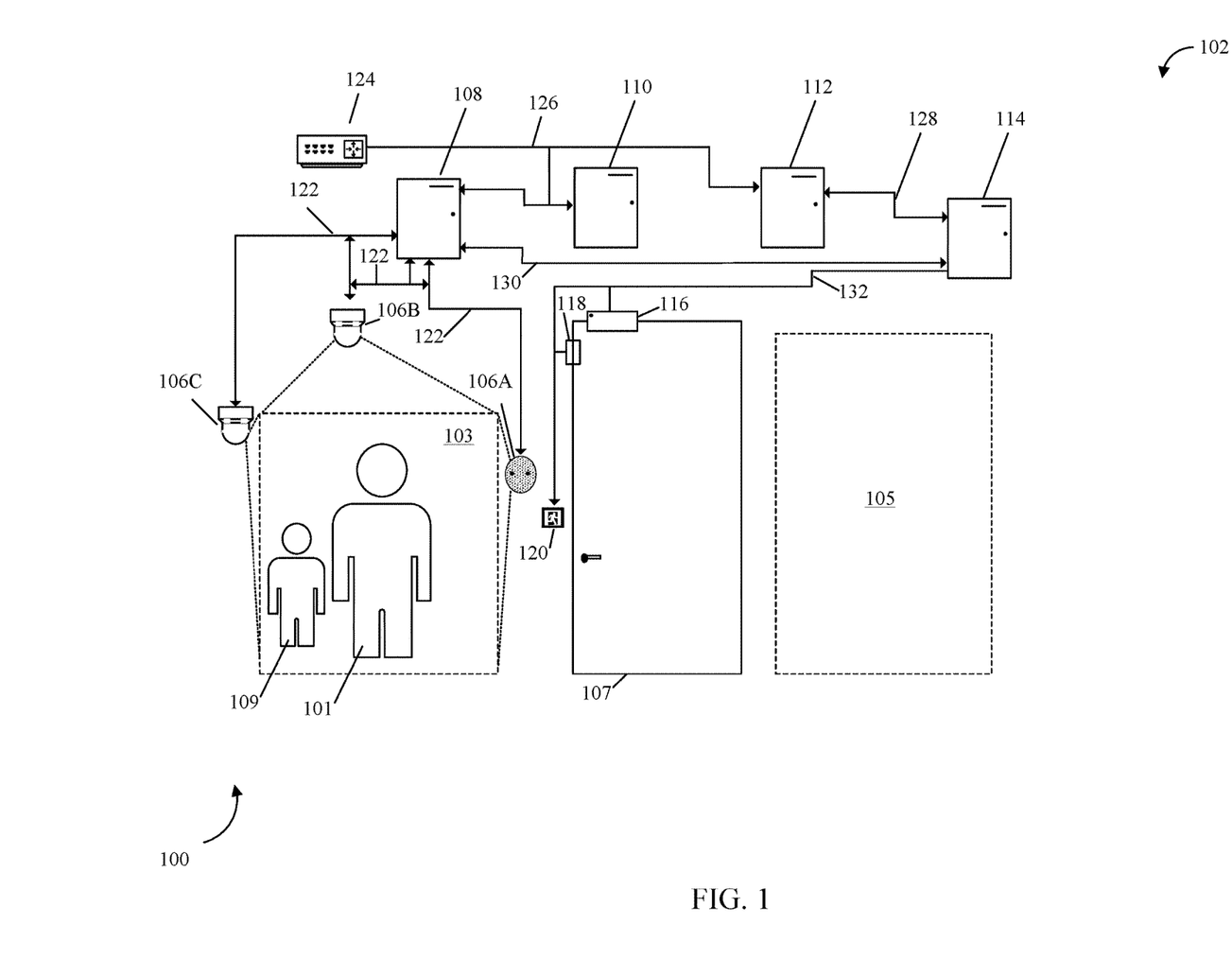
FIG. 1 illustrates a schematic view of an example operating environment of an access control system implementing detection of a tailgating event, in accordance with aspects of the present disclosure.

Referring to FIG. 1, in an example implementation, an operating environment 100 includes an access control system 102 for managing and controlling access, via an access point 107, to one or more restricted locations 105 by one or more specific users 101, by determining a mismatch between a number of authorized users 101 in a surveillance area 103 identified by a first sensor 106A and a number of individuals, e.g., authorized user 101 and individual 109, identified by one more other sensors, for instance, sensors 106B and 106C. The access control system 102 may comprise a plurality of sensor(s) 106A-106C, such as cameras, that each obtain an image of the surveillance area 103, which may include one or more user(s), such as authorized user 101 and/or one or more other unauthorized users, such as individual 109. In one aspect, the images generated by the sensors 106A-106C may be a video comprising a plurality of image frames, or a single still frame. For example, in one example implementation, a first sensor 106A may be located on a wall near an access point, such as a door to a restricted area. In some implementations, the plurality of sensors 106A-106C may comprise a plurality of camera devices used in conjunction with each other. For example, the first sensor device 106A may capture an image of a user 101 comprising their face as they approach the location of the access point 107, while the second sensor device 106B and/or the third sensor device 106C, which may be located on a ceiling, or on a different position on the wall or on a different wall relative to the first sensor device 106A, may supplement the image obtained by the first sensor device 106A with an image of an area around the user 101. In this case, due to the different perspectives of the second sensor device 106B and/or the third sensor device 106C relative to the surveillance area 103 and the first sensor device 106A, the images captured may include one or more areas that may not be within the field of view of the first sensor device 106A and/or one or more areas within the field of view of the first sensor device 106A but that may be obstructed by the user 101 or another person or object. In this case, for example, the second sensor device 106B and/or the third sensor device 106C may identify a second individual, e.g., individual 109, in the surveillance area 103 that was not detected by the first sensor device 106A. As such, the supplemental information obtained by the second sensor device 106B and/or the third sensor may help the access control system 102 to determine whether more than one user is attempting to gain access to location 105, and if such additional users are not authorized, for indicating a tailgating event.

In an implementation, in response to obtaining an image or images, the sensors 106A-106C may transmit the raw data of the image(s) to a control unit 108 via bus 122. In an implementation, bus 122 may be a CAT6 shielded cable or any other suitable bus that provides both data transfer and power to the sensors 106A-106C. In an implementation, the second sensor 106B and the third sensor 106C may be communicatively coupled to the first sensor 106A via bus 122. In another example implementation, the sensors 106B-106C may have object detection capabilities described in greater detail below. In such implementation, the second sensor 106B and the third sensor 106C may send information about the detected object(s) (object detection results) to the first sensor 106A via bus 122.

The control unit 108 receives the raw data from the sensors 106A-106C, and may forward the raw data via bus 126 to an Object Identification Server 110. In another example implementation, the control unit 108 may support wired or wireless communication (e.g., Bluetooth™ and/or WiFi), which can allow for multifactor authentication, when implemented in conjunction with facial recognition. Further, bus 126 may also be connected a network switch 124 (e.g., a POE+ switch), allowing broadband capability for remote access.

The Object Identification Server (OIS) 110 may receive the raw live video and/or the still image(s) from one or more sensors 106A-106C for processing to detect/identify/classify objects and to determine an identity(s) of the user(s). The OIS 110 may perform detection of the object using the received video and using deep learning algorithms (for example, You Only Look Once (YOLO) algorithm). The detection performed by the OIS 110 will be referred to as object detection. An object region can include a region bounded by a boundary of the object. In some implementations, the OIS 110 may output the detection result of an object (also referred to as an "object detection result" or a "detection result" hereinafter). An object detection result may include information for each object, for example, information indicating the position of the object, the size of the object, and the like. In some implementations, the object detection result may include, for example, information indicating a rectangle circumscribing a region in a frame of a video from which each object is detected, the coordinate values of the centroid of the object region, information indicating the width of each object, information indicating the height of each object, and the like. In some implementations, the object detection result may include other information. For example, the object detection result may include the coordinate values of the uppermost end and the lowermost end of the object region instead of or in addition to the coordinate values of the centroid of the object region. The object detection result may also include information for each object such as information indicating the position and size of each object and/or approximate distance between objects, if more than one object is detected by the OIS 110.

The OIS 110 may also perform facial recognition on the raw stream obtained from the first sensor 106A. Further, in another example implementation, the OIS 110 may store digital representations of objects and facial data entered previously, not actual images of objects/faces. Examples of digital representations of object data and facial data may include, but are not limited to, bitmaps, hashed or other encoded versions of the image data, etc. The OIS 110 may be updated with new or additional digital representations of objects/users via management server 112. The OIS 110 may be located in the same location as the sensors 106A-106C and control unit 108, for example, the same building or room, or may be located in a remote location, for example, in the cloud or a remote building from the management server 112 and the sensors 106A-106C. In one example of operation, the OIS 110 may compare the obtained facial recognition of the raw data stream to the digital representations of faces previously stored in a database to determine whether there is a match. In response to the comparison, the OIS 110 may generate an identification determination signal indicating if the user(s) is/are known (e.g., a match with the previously entered facial data is found or determined within a threshold level of confidence) or unknown, and providing information about the identification if the person is known (e.g., a name and/or identifier associated with the identified user). In another example implementation, the OIS 10 may not generate the identification determination signal if the user(s) is/are unknown in the database. In another example implementation, the generated identification determination signal may further comprise a confidence score. The OIS 110 may transmit the generated identification determination signal to the control unit 108 and/or the management server 112 via bus 126.

The management server 112, described in detail below, may also receive the identification determination signal via the bus 126. The management server 112 may log/record the identification determination signal; for example, the comparison results may be logged/recorded, the confidence score may be logged/recorded, the time and/or date the comparison was performed may be logged/recorded, the decision by the OIS 110 may be logged and/or recorded, and/or the name/identity of the user may be logged/recorded. The management server 112 may be located in the same location as the sensors 106A-106C and control unit 108, for example, the same building or room, or may be located in a remote location, for example, the cloud or a remote building from the management server 112 and the sensors 106A-106C.

Referring back to the control unit 108, the OIS 110 may transmit the identification determination signal via bus 126 to the control unit 108, which may operate to control access to the restricted area. The control unit 108 may transmit the identification determination signal to an access device 114 via bus 130. In one example implementation, the control unit 108 may support Bluetooth and/or WiFi communications, which may allow other types of multifactor authentication. In one example implementation, the control unit 108 may transmit an indication signal back to the first sensor 106A via bus 122. The first sensor 106A may output indications to the user at the location of the first sensor 106A via lights and/or sound. The visual or light-based indications will discussed in detail below. In one example implementation, control unit 108 may exchange messages with access device 114 via bus 130, wherein such communication messages may be in a particular protocol, for example, Open Supervised Device Protocol (OSDP) and Wiegand.

The access device 114 may store access control information, which may include data that identifies if a user is allowed access to a specific location in order to make an access control decision. For example, the access device 114 may store information indicating that a known user, e.g., user A, is permitted to access a specific location. Further, the access control information may be stored as a lookup table comprising information on specific users and the specific locations for which they may be allowed access.

In an optional aspect, the management server 112 may supply the access data stored in the access device 114 via bus 128. The access data may be updated on a specific schedule, for example, every day, or may be updated when new information is placed in the management server 112. In another example implementation, the access data may be stored solely on the management server 112, or shared between the management server 112 and the access device 114.

In any case, for example, the access device 114 may receive the identification determination signal via bus 130 that indicates that user 101 is recognized and identified, as described above. The access device 114 may attempt to determine if user 101 has access to restricted location 105 via the access data stored in the device, or request the data from the management server 112.

Upon determination to grant or deny access to an identified user, an access control signal is transmitted via bus 132 and 130 indicating the access status of the identified user.

The control unit 108 may receive the access control signal from the access device 114, and the information from the one or more additional sensors, e.g., second and/or third sensor devices 106B and/or 106C, in order to generate an output signal to enable access or to provide a tailgating notification. For example, the control unit 108 may receive the access control signal via bus 130 comprising the access status indicating if the identified user has been granted access or denied access to a specific location. Further, the control unit 108 may receive additional camera info as a continuous metadata stream (of XML formatted data) across an IP network connection. The metadata will contain details of the objects identified in the video stream along with their location and size.

Additionally, the control unit 108 may compare a number of authorized users identified via the first sensor device 106A to a number of individuals identified by one or more additional sensors, e.g., second and/or third sensor devices 106B and/or 106C, respectively. In other words, the control unit 108 may validate the tailgating event prior to generating the output signal.

In one example implementation, the control unit 108 may transmit the output signal back to the first sensor 106A via bus 122. The first sensor 106A may output indications to the user at the location of the first sensor 106A via lights and/or sound based on the output signal. The visual indications and audible indications will be discussed in detail below, but may indicate that access is allowed or denied, and/or that a tailgating event is detected.

The access control system 102 may further include a controllable locking unit 116, for example attached to a door hinge, frame, door knob, handle, lock, or another feature or structure of the access point 107 that is removably blocking access to the location 105. The locking unit 116 may receive the output signal, via bus 132, where the output signal includes the access status indicating if the identified user has been granted access or denied access to the location 105 and/or the tailgating notification. For example, the locking unit 116 may be an electronically controllable mechanical actuator that can be controlled to move between a locked position and an unlocked position.

In one example implementation, if the user(s) has been identified, as described above, and has been granted access to the location 105 via the control device 114 and a tailgating event has not be identified, then the locking unit 116 unlocks the access point 107, such as but not limited to a door (or a gate, etc.) to enable the user 101 to access the location 105. In an example implementation, an access point sensor 118 may be used to determine if the access point 107 has been opened, closed, how long the access point 107 has been opened and how long the access point 107 has been closed, in order to make subsequent access-related decisions. For example, the locking unit 116 may not unlock the access point 107 again if the access point 107 has not yet been determined to be closed via access point sensor 118. Further, an emergency opening device 120 may be present on the reverse side of the access point 107. The emergency opening device 120 may be triggered by a user 101 in an emergency to immediately unlock the access point 107 via the locking unit 116.

In another example implementation, if the user(s) has been identified and has been granted access to the location 105 but a tailgating event is identified, then the locking unit 116 does not unlock the access point 107 until the tailgating event is resolved.

Figure 2:
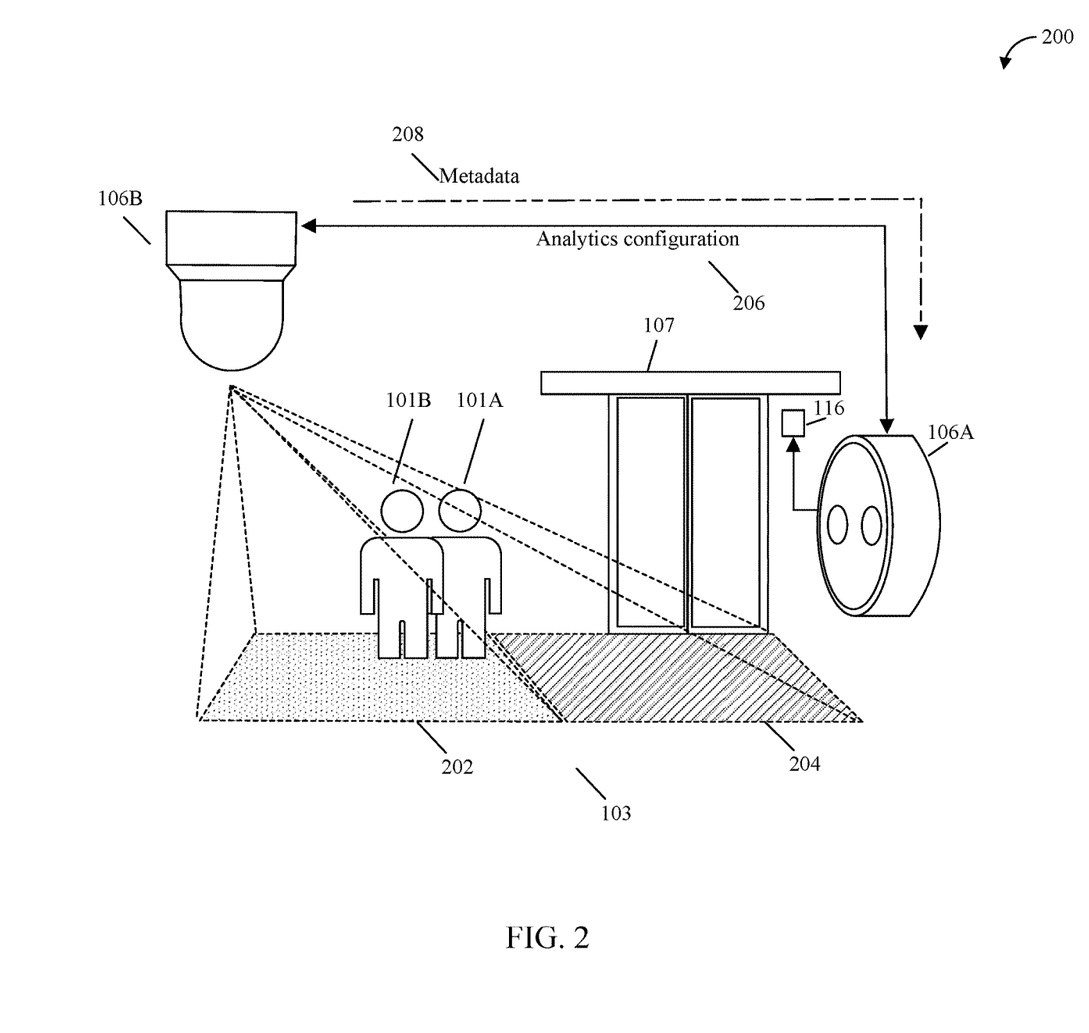
FIG. 2 is a schematic view of another example operating environment of an access control system implementing detection of a tailgating event similar to FIG. 1 but further including detection of tailgating in different regions of a surveillance area, in accordance with aspects of the present disclosure.

Further details regarding an example method of operation of the system with respect to detecting tailgating events are illustrated in FIG. 2 and will be described below with reference to FIG. 3.

The structure and configuration of the first sensor 106A is described in detail below with reference to FIG. 4.

Referring to FIG. 2, in another example implementation, the operating environment 200 includes all or portions of the access control system (shown in FIG. 1) for managing and controlling access to specific locations by specific users, by determining the identities of users based upon their visual appearance and by detecting tailgating events, according to an aspect of the disclosure. As described above with reference to FIG. 1, the same aspects are illustrated in FIG. 2. In one aspect, the first sensor 106A may further interact with one or more additional sensor(s) 106B, such as additional video camera(s), to determine if tailgating users are present in order to issue a tailgating notification or to allow access to the restricted area. The additional sensor(s), such as the second sensor 106B, may all be placed at different locations and/or at different installation heights. In one example implementation, rather than using facial recognition alone, a number of users in a surveillance area may be further identified based on the images captured from the second sensor 106B. In addition, the second sensor 106B may capture additional user information, for example, their physical proportions, and/or other non-biometric data particular to the user. Working in conjunction with each other, sensors 106A and 106B may provide improved user validation and may provide detection of tailgating event for the access control system 102. For instance, since first sensor device 106A may be installed at head height, it might be unable to identify one or more individuals 109 standing/walking behind the individual 101 located closest to the first sensor 106A. This is an event referred to hereinafter as a tailgating event.

In an aspect, the second sensor 106B may be configured to provide bi-directional counting of people, by detecting objects entering/exiting a scene from user marked regions. In an aspect, people counts can be reported to the first sensor device 106A, for example. Count data may be saved directly on-board the second sensor 106B up to a predefined number of days. In addition, the second sensor 106B may alarm the first sensor 106A when objects enter into a user-drawn zone from outside of the zone. For example, the second sensor 106B may alarm the first sensor 106A when objects move from a predefined amber zone 202 to a predefined red zone 204.

In an aspect, if more than one object, e.g., user or individual such as user 101, is detected within a monitored zone (such as zones 202 and 204, which may comprise surveillance area 103 described in FIG. 1), the second sensor 106B, for example, may be configured to determine a distance between the detected objects. For example, the second sensor 106B may utilize interferometry, time-of-flight, and/or triangulation-based principles depending on the requirements on accuracy, the standoff distance between the sensor and the object, and the required depth of field.

In an aspect, if more than one sensor is used to monitor the surveillance area 103, each sensor may perform its own approximation of the distance between the detected objects and may send the approximated values to the control unit 108. In an aspect, the control unit 108 may collect approximations from all sensors and may calculate the approximate distance between the detected objects based on the cumulative data received from all sensors 106A-106C.

In an aspect, calibration techniques may allow for the calibration of an arbitrary number of sensors 106A-106C in the operating environment 200. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters defining a position of an object in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed.

Each camera 106A-106C has an associated point of view and field of view. A point of view refers to the position and perspective from which a physical region is being viewed by a camera. A field of view refers to the physical region imaged in frames by the camera.

As shown in FIG. 2, during initial setup phase, the first sensor 106A may send analytics configuration information 206 to the second sensor 106B. This configuration information may define corresponding zones 202-204 to be monitored by each camera 106. The configuration information 206 may further include metadata type, for example. Each camera 106A-106C may associate metadata 208 with images of the moving object (referred to as an "object" for short). These metadata 208 define various characteristics of the object. For instance, the metadata 208 can define the location of the object within the camera's field of view, the width or height of the image of the object (e.g., measured in pixels), the direction the image of the object is moving in, the speed of the image of the object, the color of the object, and/or a category of object. These are pieces of information that can be present in metadata associated with images of the object; other metadata is also possible. The category of object refers to a category, based on various characteristics of the object. For example, categories can include: humans or animals. Metadata regarding events involving moving objects 208 may also be transmitted by the second sensor 106B to the first sensor 106A. Such event metadata 208 may include: an object entering the field of view of the camera, an object leaving the field of view of the camera, the object remaining in the camera's field of view for greater than a threshold period of time, multiple moving objects detection, object counting, distance between objects, an object entering an area of interest (e.g., a predefined area where the movement of objects is desired to be monitored, such as red zone 204), an object leaving a predefined zone, an object moving in a direction matching a predefined forbidden direction for a zone, object removal, object abandonment (e.g., when an object is still longer than a predefined period of time and its size is smaller than a large portion of a predefined zone), and a dwell timer (e.g., the object is still or moves very little in a predefined zone for longer than a specified dwell time). In an aspect, the metadata 208 may include a distance between the detected objects. The metadata 208 may also indicate whether any of the detected objects are wearing a mask.

The control unit 108 (shown in FIG. 1) may analyze the live raw video received from each of the sensors 106A-106C and provide an output containing the identified user or users in the live video. The output may further include an indicator of a determined tailgating event and a confidence level of such determination. In one example implementation, the control unit 108 may also store the video, the location and/or time that a tailgating event is identified as the historical data. In one example implementation, when tailgating determination is not complete, for example, partially obscured or from a longer distance away, the control unit 108 may still provide tailgating information with a confidence score based on a previous, higher confidence determination in combination with matching one or more characteristics associated with the previous determination, e.g., a particular size, shape, and/or color of an article of clothing. The method of the system illustrated in FIG. 2 will be described below with reference to FIG. 3.

Figure 3:
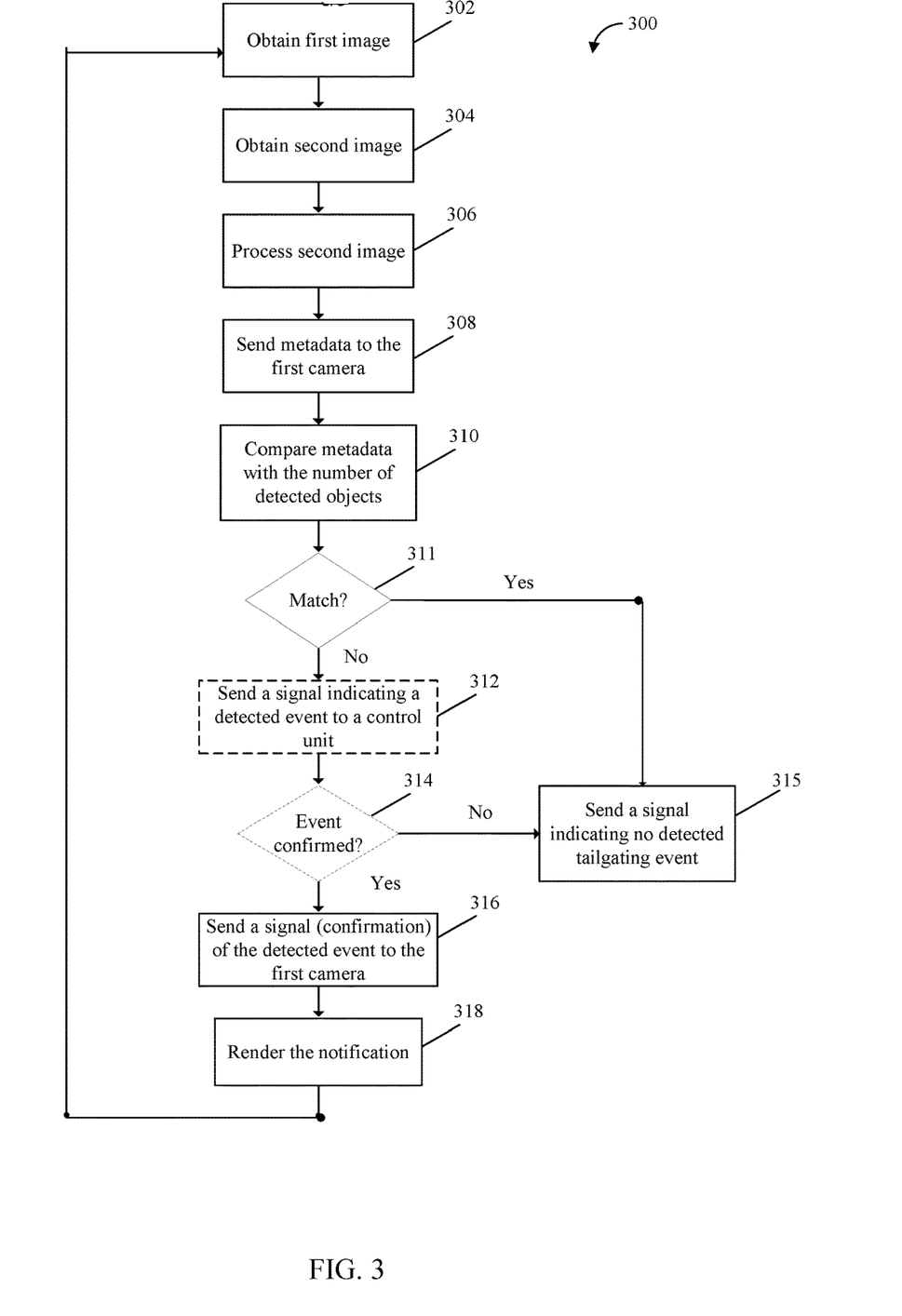
FIG. 3 is a flowchart of an example method of operation, and interactions between various modules of, the access control system implementing tailgating event detection, in accordance with aspects of the present disclosure.

Referring to FIG. 3, an example of a method 300 of the operation of and interactions between various modules of the access control system implementing tailgating event detection is explained in accordance with one implementation. FIGS. 1 and 2 may be referenced in combination with the flowchart of FIG. 3. To start, method 300 includes one or more users attempting to access a specific access control location, as described above. At step 302, the first sensor 106A, e.g., a camera, may generate the raw live video stream (a first image of the surveillance area). In an aspect, the first sensor 106A may transmit the raw video steam to the control unit 108. The first sensor 106A may be mounted at a first location. In an aspect, the first sensor 106A may contain a plurality of segments of a light ring, as described below with reference to FIG. 4. The first sensor 106A may be configured to perform facial recognition of the user attempting to access the restricted area. At step 304, the second sensor 106B may also generate the raw live video stream (a second image of the surveillance area) In an aspect, the second sensor 106B may also transmit the raw video steam to the control unit 108. The second sensor 106B may be mounted at a second location different from the first location of the first sensor and at height different from the mounting height of the first sensor 106A. The second sensor 106B may be communicatively coupled to the first sensor 106A via bus 122. The second sensor 106B may be configured to process the generated video in order to detect and count one or more objects (e.g., individuals) in the second image of the surveillance area (step 306). The second sensor 106B may send metadata 208 (e.g., the information regarding the one or more detected objects to the first sensor) at step 308. The first sensor 106A may compare the information regarding the objects detected by the second sensor 106B with a number of objects detected using the first image at step 310. More specifically, this is the number of individuals that are identified (or not known) via facial recognition.

If the number of person count (a count of number of individuals in the second image) from second sensor 106B and the facial recognition count (a number of individuals in the first image having authorized access to the restricted area) from first sensor 106A does not match (e.g., the second count exceeds the first count) (decision at 311, no branch) and at least one of the numbers is greater than one, then at step 316 a signal is sent indicating a detected tailgating event. Alternatively, if the number of detected objects does match (decision at 311, yes branch), then an output signal is generated at 315 that confirms that there is not a tailgating event, and access may be granted if the one or more objects (e.g., individuals) are authorized to have access via the access point.

In an optional aspect, at steps 312 and 314, the control unit 108 may confirm the tailgating event by comparing the video generated by both sensors 102A-102B. If the tailgating event is detected and/or confirmed (decision at 314, yes branch), a signal may be sent to the first sensor 106A at step 316. Alternatively, if the tailgating event is not confirmed (decision at 314, no branch), e.g., if the number of detected individuals by the first sensor 106A and the second sensor 106B is determined to match, then an output signal is generated at 315 that confirms that there is not a tailgating event, and access may be granted if the one or more objects (e.g., individuals) are authorized to have access via the access point.

When the tailgating event is determined, the first sensor 106A may receive the signal sent at step 316 and may be configured to provide a visual and/or audible notification to the user at the access location, as described below. If the tailgating event is detected and all users are identified, a signal may be sent to the first sensor 106A and the access device 114 at step 316. The first sensor 106 may receive the signal sent at step 316 and may be configured to provide a visual and/or audible notification to the user at the access location, as described below. Further, the access device 114 receives the signal transmitted during step 316. If at least one user associated with the detected tailgating event is denied access, the locking unit 116 does not unlock the door. If all the users associated with the detected tailgating event are identified and granted access, a signal may be sent to the locking unit 116, in response to which the locking unit 116 unlocks the door at the access point.

In an aspect, the control unit 108 may determine user notification criteria. For example, the control unit 108 may determine the illumination sequence of the first sensor 106A, described below, based on at least a signal indicating tailgating event determination, user(s) identification, access determination and face determination. Alternatively, the control unit 108 may ask the first sensor 106A to render an audible notification. Such an audible indication of the tailgating event could be a recording saying, for example, "More than one person is detected, please move away from each other." The control unit 108 may send the criteria to the first sensor 106A at step 316.

At step 318, the first sensor 106A may render the notification. For example, the first sensor 106A may illuminate the LEDs in a specific illumination sequence based on the system determinations, described below.

In an aspect the method 300 may return to step 302 after generating the notification in order to allow the individuals to space themselves apart in response to the notification and retry the access procedure.

In other words, the method 300 includes a method for controlling access to a restricted area by an access control device. The method includes obtaining a first image of a surveillance area adjacent to an access point to the restricted area using a first sensor mounted at a first location. The first sensor is configured to detect a number of objects in the first image of the surveillance area. A second image is obtained using a second sensor mounted at a location different from a location of the first sensor. The second sensor is communicatively coupled to the first sensor. The second sensor is configured to detect one or more objects in the second image. The second image is processed, using the second sensor, to obtain information regarding the one or more detected objects in the second image of the surveillance area. The information regarding the one or more detected objects is sent from the second sensor to the first sensor. The information regarding the one or more objects detected using the second image is compared with a number of objects detected using the first image by the first sensor. A tailgating event is identified, by the first sensor, in response to determining that the number of objects detected using the first image does not match the information regarding the number of objects detected using the second sensor. A tailgating notification is outputted, by the first sensor, indicating a tailgating event, in response to identifying the tailgating event.

In one or any combination of these aspects, the information regarding the one or more detected objects in the second image includes at least a count of individuals detected in the surveillance area and an approximate distance between the individuals detected in the surveillance area.

In one or any combination of these aspects, the first sensor sends the first image to the access control device. The second sensor sends the second image to the access control device. The access control device confirms the tailgating event by comparing the first image with the second image. The access control device generates a control signal based on the confirmation. The control signal includes an access denied command when the tailgating event is confirmed.

In one or any combination of these aspects, a light emitting device of the first sensor is illuminated to provide an access indication based upon the control signal. The access indication includes a first pattern of illumination when the control signal indicates the detected tailgating event. The access indication includes a second pattern of illumination when the control signal does not indicate the detected tailgating event.

In one or any combination of these aspects, each of the first illuminated pattern and the second illuminated pattern is produced in a plurality of colors.

In one or any combination of these aspects, an audible output is generated using a speaker of the first sensor based upon the control signal.

In one or any combination of these aspects, the first sensor sends to the second sensor, prior to obtaining the second image, configuration information including at least information identifying the surveillance area.

In one or any combination of these aspects, the first location is at a height lower than the second location.

In one or any combination of these aspects, obtaining the first image of the surveillance area using the first sensor and obtaining the second image of the surveillance area using the second sensor occur within a time duration threshold.

Similarly and in other words, from the perspective of the first sensor, the method 300 includes obtaining a first image of a surveillance area adjacent to an access point to the restricted area using a first sensor, mounted at a first location. The first sensor is configured to detect a number of objects in the first image of the surveillance area. The first sensor receives information regarding the one or more detected objects in a second image obtained by the second sensor. The second sensor is mounted at a second location different from the first location of the first sensor. The second sensor is communicatively coupled to the first sensor. The information regarding the one or more objects detected using the second image is compared with a number of objects detected using the first image by the first sensor. A tailgating event is identified, by the first sensor, in response to determining that the number of objects detected using the first image does not match the information regarding the number of objects detected using the second sensor. A tailgating notification is outputted, by the first sensor, indicating a tailgating event, in response to identifying the tailgating event.

Figure 4:
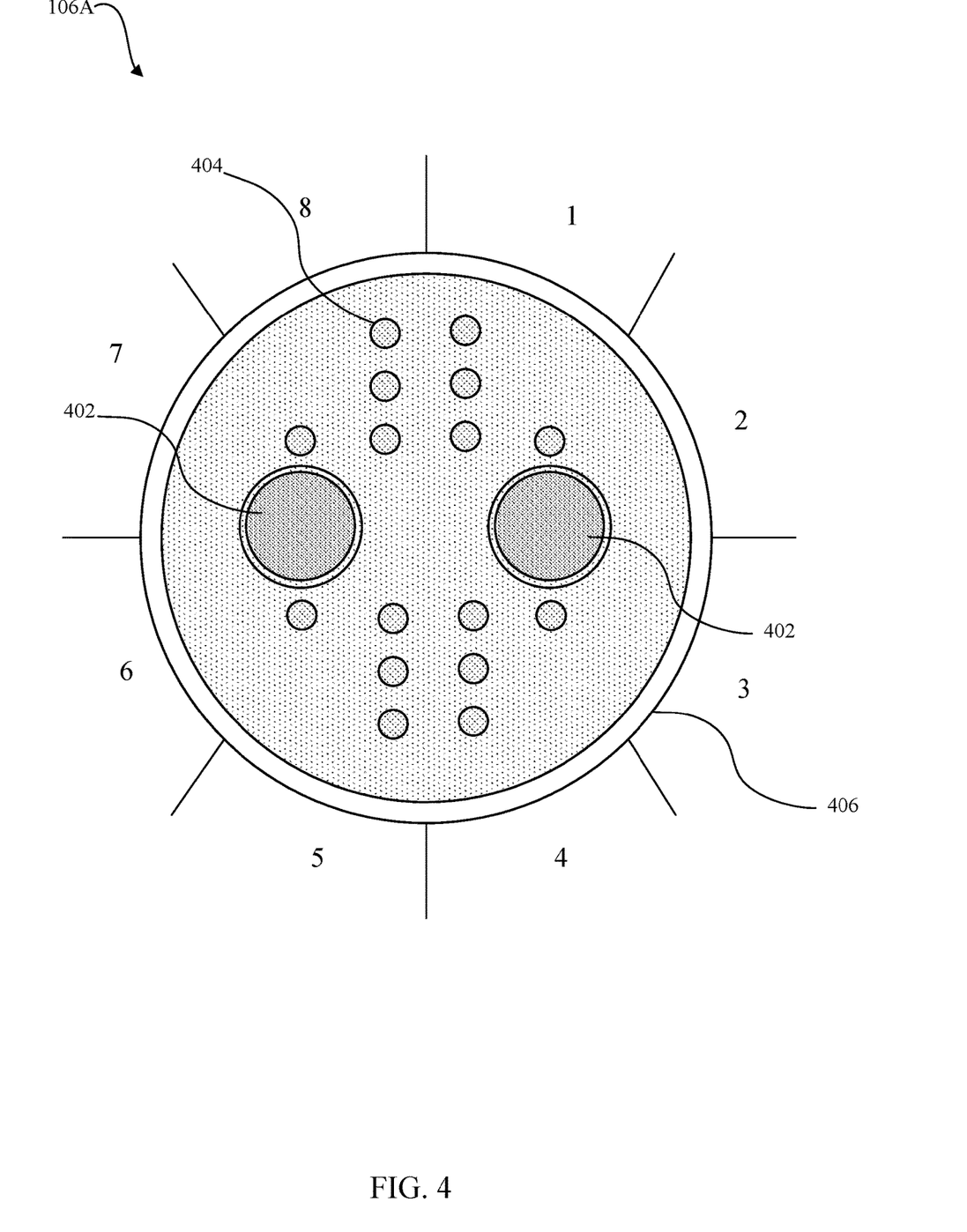
FIG. 4 is a front view of an example visual and audible feedback access control device in accordance with aspects of the present disclosure.

Referring to FIG. 4, an example visual feedback access control device includes the first sensor 106A, as referenced above, which may contain a plurality of segments of a light ring 406. Each of the plurality of segments of the light ring 406 may comprise a plurality of light emitting diodes (LEDs). The LEDs, for example, may be a single LED device containing one red, green, and blue (RGB) LEDs. In one example implementation, the first sensor 106A of FIG. 4 may comprise 8 segments, each of the 8 segments of the light ring 406 may each contain at least one LED. In one example implementation the first sensor 106A may comprise a plurality of sensor devices 402. As described above, the one or more sensor devices 402 may be a video camera, or a still camera that captures a plurality of images. In another example implementation, the first sensor 106A may alternatively or additionally comprise a plurality of infrared (IR) illumination units 404. The IR illumination units 404 may detect infrared energy (heat) and convert the detected heat into an electronic signal, which is then processed to produce a thermal image. In another example implementation, the IR units 404 may aid in night time illumination and also provide illumination in the day time to improve the facial data gathered for recognition. As illustrated in FIG. 4, for example, 16 separate IR illumination units are present, but this implementation is not limiting and it should be understood that any number of IR illumination units may be present.

In one example implementation the first sensor 106A may also comprise a speaker and a microphone (not shown). The speaker and the microphone may be configured to work as an intercom systems. In an implementation, for example, the speaker and microphone may communicate with other components of the system using a communication protocol, such as but not limited to the Session Initiation Protocol (SIP). In one example implementation, the speaker may be configured to generate tailgating notifications when multiple users attempt to access a specific location. The first sensor 106A may provide additional audible notifications to users, for example, that their image has been captured, the user has been identified, the user has been granted access to the specific location, the user has been denied access, the user has not been identified, and the like. For example, the audible notifications may be implemented with a synthesized voice or play an audio file to the user. Bus 122 in FIGS. 1 and 2, as described above, my provide a signal to generate the notifications. In another example implementation, the microphone may provide audible communications to employees that manage operation of the system, for example, a two-way communication between the user 106 and an employee operating the system to discuss reasons for the user's denial of access to a specific location, requesting additional information from the user(s) associated with the detected tailgating event, or the like. In another example implementation the speaker and/or microphone of the first sensor 106A may provide audible notifications and communication regarding an alarm or duress situation.

As described above, the first sensor 106A may receive signals via bus 122 referenced in FIGS. 1-3. The signals may instruct the first sensor 106A to illuminate the segments in different illumination sequences based on one of a plurality of trigger events. For example, some trigger events may be: a tailgating event detected by the first sensor 106A; the image being a match with one of a plurality of known images in a database when compared by the OIS 110; the image not being the match with any of the plurality of known images in the database of the 110; one or more users wearing a mask; or an alarm/duress event. The illumination sequences generated by the LEDs, for example, may be rotating green and blue colors; solid colors such as all yellow, all blue, all green all red; only the top half with solid colors; only the bottom half with solid colors; or flashing colors. Any color may be associated with any illumination sequence and with any trigger event. For example, each trigger event may have a respective pre-programmed illumination sequence, or each trigger event may be user selected.

Figure 5:
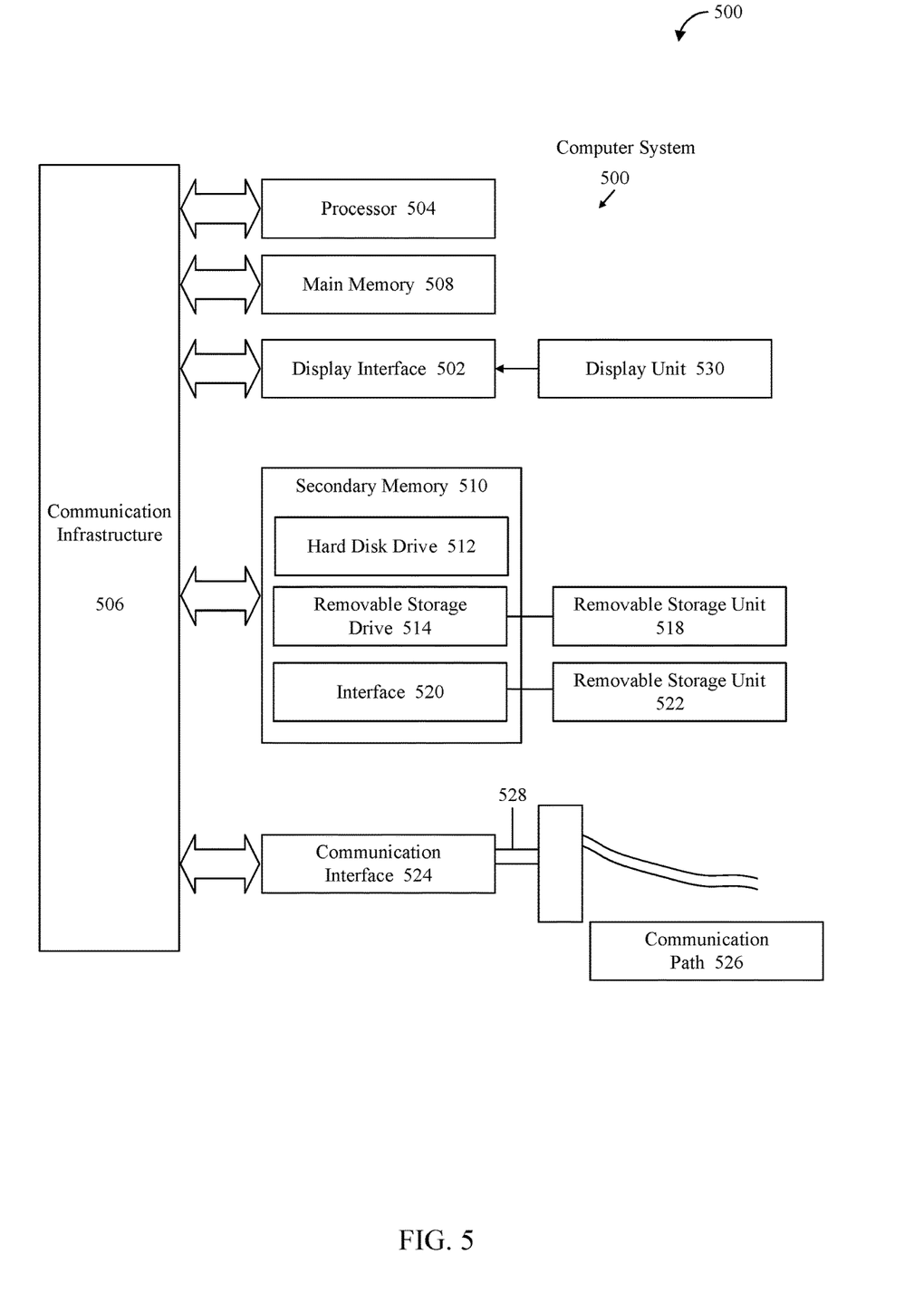
FIG. 5 is a block diagram of various hardware components and other features of a computer system that may operate the access control system in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 504, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 506, such as a bus (or any other use of "bus" herein, such as bus 122, 126, 128, 130, and/or 132 as discussed above), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 500, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method comprising:
    receiving, during an initial setup, by a first sensor that is mounted at a first height in a surveillance area, from a second sensor that is mounted at a second height that is lower than the first height and is configured for performing facial recognition to allow access to a restricted area, configuration information that defines a first zone and a second zone of the surveillance area, the second zone being closer to an access point to the restricted area than the first zone;
    monitoring, by the first sensor, the first zone and the second zone subsequent to the initial setup, including capturing a first image by the first sensor;
    determining, using the first image captured by the first sensor, that a first count of one or more objects have moved from the first zone to the second zone of the surveillance area;
    obtaining a second image of the surveillance area adjacent to the access point to the restricted area using the second sensor and responsive to the first sensor determining that the first count of the one or more objects have moved from the first zone to the second zone, wherein the second sensor is configured for performing facial recognition to allow access to the restricted area to a number of objects detected in the second image of the surveillance area;
    determining a second count of the number of objects, based on the facial recognition performed on the second image;
    identifying a tailgating event in response to determining that the first count does not match the second count;
    outputting a tailgating notification to indicate the tailgating event, wherein the tailgating notification is configured to direct the one or more objects to move away from each other; and
    retrying the facial recognition for access to the restricted area, in response to outputting the tailgating notification.

2. The method of claim 1, further comprising determining, using the first image, an approximate distance between the one or more objects.

3. The method of claim 1, further comprising sending the first image and the second image to an access control device, wherein the access control device is configured to confirm the tailgating event by comparing the first image with the second image and generate a control signal based on confirming the tailgating event, wherein the control signal comprises an access denied command when the tailgating event is confirmed.

4. The method of claim 3, further comprising illuminating a light emitting device associated with the second sensor to provide an access indication based upon the control signal, wherein the access indication comprises a first pattern of illumination when the control signal indicates the tailgating event, and wherein the access indication comprises a second pattern of illumination when the control signal does not indicate the tailgating event.

5. The method of claim 4, wherein each of the first pattern and the second pattern is produced in a plurality of colors.

6. The method of claim 3, wherein outputting the tailgating notification includes generating an audible output using a speaker associated with the second sensor based upon the control signal.

7. The method of claim 1, wherein the second sensor is configured to send to the first sensor, prior to obtaining the first image, configuration information comprising at least information identifying the surveillance area.

8. The method of claim 1, wherein the first image includes one or more areas that are:
    outside a field of view of the second sensor; and/or
    within the field of view of the second sensor but obstructed by the one or more objects.

9. The method of claim 1, wherein determining that the first count of the one or more objects have moved from the first zone to the second zone and obtaining the second image of the surveillance area using the second sensor occur within a time duration threshold.

10. The method of claim 1, wherein identifying the tailgating event comprises determining that the first count is more than the second count.

11. The method of claim 1, wherein the first zone and the second zone are defined based on analytics configuration information received by the first sensor from the second sensor.

12. A system comprising:
a first sensor mounted at a first height in a surveillance area; and
a second sensor mounted at a second height that is lower than the first height and configured for performing facial recognition to allow access to a restricted area,
wherein the first sensor is configured to;
receive, during an initial setup, from the second sensor, configuration information that defines a first zone and a second zone of the surveillance area, the second zone being closer to an access point to the restricted area than the first zone;
monitor the first zone and the second zone subsequent to the initial setup, including capturing a first image by the first sensor; and
determine, using the first image, that a first count of one or more objects have moved from the first zone to the second zone of the surveillance area,
wherein, responsive to the first sensor determining that the first count of the one or more objects have moved from the first zone to the second zone, the second sensor is configured to:
obtain a second image of the surveillance area adjacent to the access point to the restricted area;
determine a second count of a number of objects, based on facial recognition performed on the second image;
identify a tailgating event in response to determining that the first count does not match the second count;
output a tailgating notification to indicate the tailgating event, wherein the tailgating notification is configured to direct the one or more objects to move away from each other; and
retry the facial recognition for access to the restricted area, in response to outputting the tailgating notification.

13. A system comprising:
one or more hardware processors configured to:
receive, during an initial setup, by a first sensor that is mounted at a first height in a surveillance area, from a second sensor that is mounted at a second height that is lower than the first height and is configured for performing facial recognition to allow access to a restricted area, configuration information that defines a first zone and a second zone of the surveillance area, the second zone being closer to an access point to the restricted area than the first zone;
monitor, by the first sensor, the first zone and the second zone subsequent to the initial setup, including capturing a first image by the first sensor;
determine, using the first image captured by a first sensor, that a first count of one or more objects have moved from the first zone to the second zone of the surveillance area;
obtain a second image of the surveillance area adjacent to the access point to the restricted area using the second sensor and responsive to the first sensor determining that the first count of the one or more objects have moved from the first zone to the second zone, wherein the second sensor is configured for performing facial recognition to allow access to the restricted area to a number of objects detected in the second image of the surveillance area;
determine a second count of the number of objects, based on the facial recognition performed on the second image;
identify a tailgating event in response to determining that the first count does not match the second count;
output a tailgating notification to indicate the tailgating event, wherein the tailgating notification is configured to direct the one or more objects to move away from each other; and
retry the facial recognition for access to the restricted area, in response to outputting the tailgating notification.

14. The system of claim 13, wherein the one or more hardware processors are further configured to determine, using the first image, an approximate distance between the one or more objects.

15. The system of claim 13, wherein the one or more hardware processors are further configured to send the first image and the second image to an access control device, wherein the access control device is configured to confirm the tailgating event by comparing the first image with the second image and generate a control signal based on confirming the tailgating event, wherein the control signal comprises an access denied command when the tailgating event is confirmed.

16. The system of claim 15, wherein the one or more hardware processors are further configured to cause a light emitting device associated with the second sensor to illuminate to provide an access indication based upon the control signal, wherein the access indication comprises a first pattern of illumination when the control signal indicates the tailgating event, and wherein the access indication comprises a second pattern of illumination when the control signal does not indicate the tailgating event.

17. The system of claim 16, wherein each of the first pattern and the second pattern is produced in a plurality of colors.

18. The system of claim 15, wherein the tailgating notification is further configured to cause an audible output by a speaker associated with the second sensor based upon the control signal.

19. The system of claim 13, wherein the second sensor is configured to send to the first sensor, prior to obtaining the first image, configuration information comprising at least information identifying the surveillance area.

20. The system of claim 13, wherein the second image includes one or more areas that are:
outside a field of view of the second sensor; and/or
within the field of view of the second sensor but obstructed by the one or more objects.

* * * * *